W. E. HOSCH AND D. TURNER.
A. M. HOSCH, ADMINISTRATRIX OF W. E. HOSCH, DEC'D.
CLOTH MEASURING AND COMPUTING MACHINE.
APPLICATION FILED OCT. 12, 1918.

1,371,028.

Patented Mar. 8, 1921.
5 SHEETS—SHEET 1.

Inventor:
Annie Mae Hosch, Admx.,
Douglas Turner,
By
Atty.

W. E. HOSCH AND D. TURNER.
A. M. HOSCH, ADMINISTRATRIX OF W. E. HOSCH, DEC'D.
CLOTH MEASURING AND COMPUTING MACHINE.
APPLICATION FILED OCT. 12, 1918.

1,371,028.

Patented Mar. 8, 1921.

Inventor:
Annie Mae Hosch, Admx.,
Douglas Turner,
By Bruce S. Faist
Atty

W. E. HOSCH AND D. TURNER.
A. M. HOSCH, ADMINISTRATRIX OF W. E. HOSCH, DEC'D.
CLOTH MEASURING AND COMPUTING MACHINE.
APPLICATION FILED OCT. 12, 1918.

1,371,028.

Patented Mar. 8, 1921.

Inventor:
Annie Mae Hosch, Admx.,
Douglas Turner;
By [signature]
Atty.

W. E. HOSCH AND D. TURNER.
A. M. HOSCH, ADMINISTRATRIX OF W. E. HOSCH, DEC'D.
CLOTH MEASURING AND COMPUTING MACHINE.
APPLICATION FILED OCT. 12, 1918.

1,371,028.

Patented Mar. 8, 1921.

Inventor:
Annie Mae Hosch, Admx.,
Douglas Turner,
By Bruce S. Elliott
Atty.

UNITED STATES PATENT OFFICE.

WALTER E. HOSCH, DECEASED, LATE OF ST. LOUIS, MISSOURI, BY ANNIE MAE HOSCH, ADMINISTRATRIX, AND DOUGLAS TURNER, OF ST. LOUIS, MISSOURI, ASSIGNORS TO MEASUREGRAPH COMPANY, OF ST. LOUIS, MISSOURI, A CORPORATION.

CLOTH-MEASURING AND COMPUTING MACHINE.

1,371,028.             Specification of Letters Patent.         Patented Mar. 8, 1921.

Application filed October 12, 1918. Serial No. 257,878.

*To all whom it may concern:*

Be it known that WALTER E. HOSCH, late a citizen of the United States, residing at St. Louis and State of Missouri, did in his lifetime, jointly with DOUGLAS TURNER, a citizen of the United States, residing at St. Louis and State of Missouri, invent new and useful Improvements in Cloth-Measuring and Computing Machines, of which the following is a specification.

This invention relates to cloth measuring and cost computing machines of the general type shown in certain prior applications for patent of the late Walter E. Hosch, and as illustrated, for example, in application Ser. No. 17,154, filed March 26, 1915, and application Ser. No. 110,963, filed July 24, 1916 and patented April 6, 1920, No. 1,336,230.

The invention has for one of its objects to improve the character of a machine of the type described by providing automatically-operating mechanism which will prevent the movable pressure-roller from being released to grip the cloth until the hands of the measuring dial have been returned to the zero position. A further object of the invention is to provide means for adjusting the tension on the upper pressure roller, whereby the grip of said roller on the fabric may be varied as occasion may require. Usually the adjustment referred to is that of increasing the tension, as the said roller becomes smoother or harder with the lapse of time and under the circumstances of extended use. A still further object of the invention is to provide an automatically operating brake for offering resistance to the movement of the measuring roller after the fabric has been measured and the rollers separated, to prevent an accidental movement of said roller which will result in showing on the dial a less or greater measurement than has actually occurred.

Figure 1:
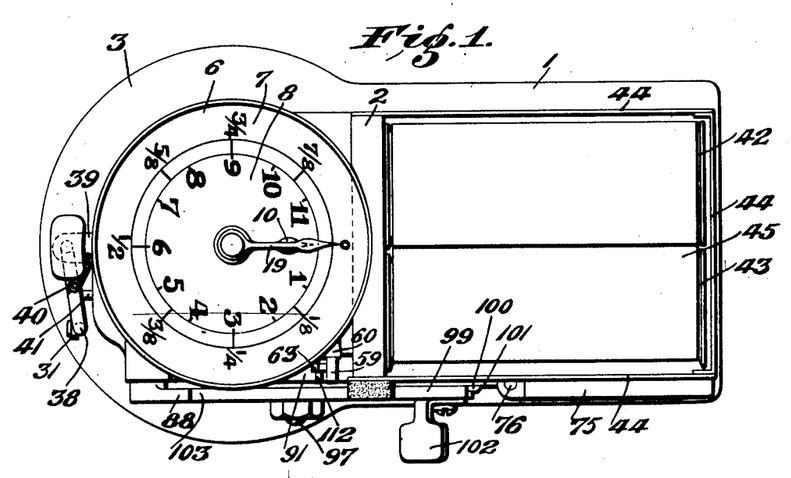
Figure 1 is a top plan view of a machine arranged according to the invention with the casing removed.
Figure 2:
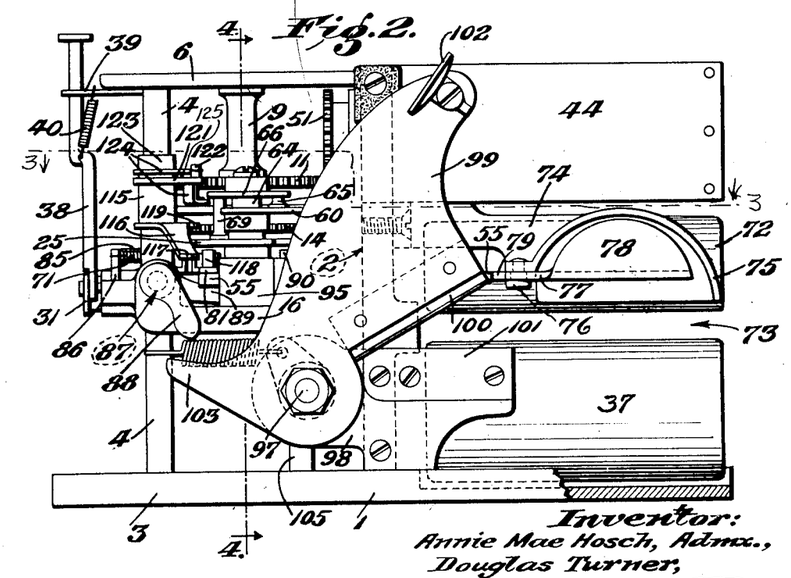
Fig. 2 is a side elevation thereof, a portion of the base plate being shown in longitudinal section.
Figure 3:
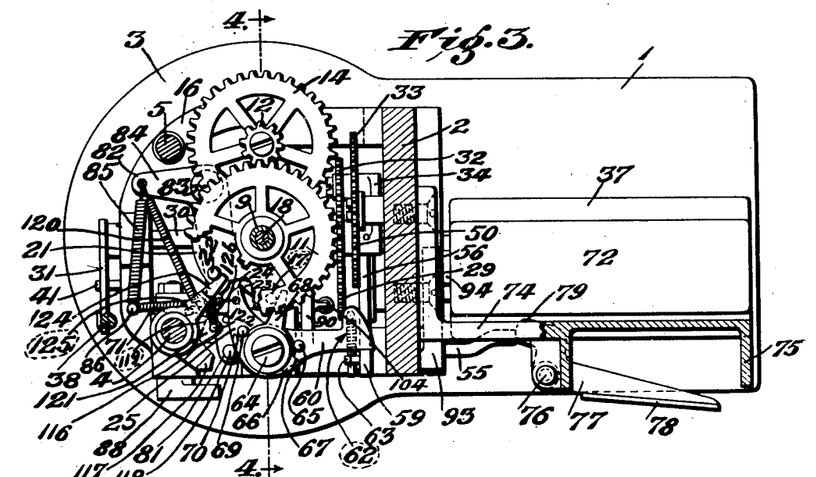
Fig. 3 is a horizontal section through the machine on the line 3—3 of Fig. 2, the shear being omitted.
Figure 6:
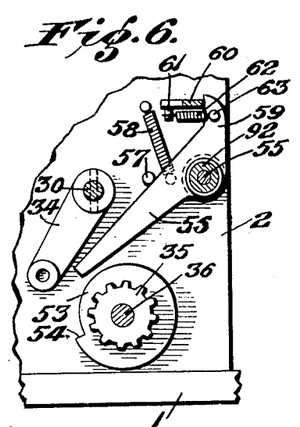
Fig. 6 is a fragmentary detail view illustrating the mechanism for locking the measuring roller at the limit of the capacity of the machine.
Figure 12:
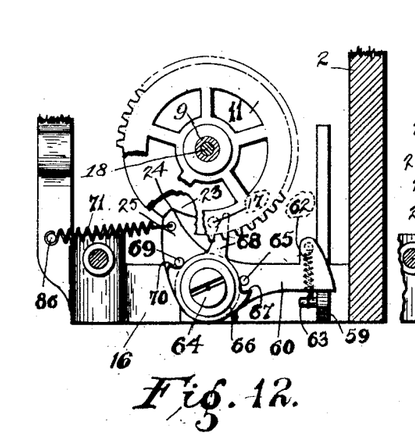
Fig. 12 is a sectional plan view on an enlarged scale showing the stop mechanism illustrated in part in Fig. 3, showing the position of the parts when the hands have been arrested at the zero position.
Figure 13:
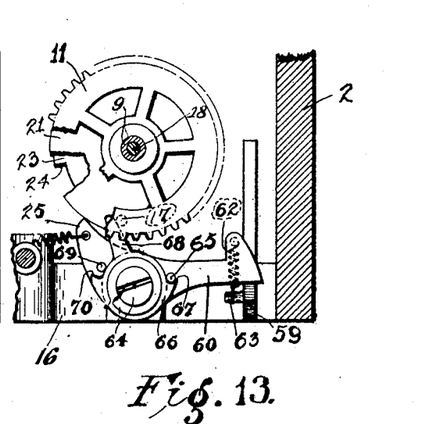
Fig. 13 is a similar view showing the position of the stop mechanism with the parts arrested when the measuring capacity of the machine has been reached.
Figure 14:
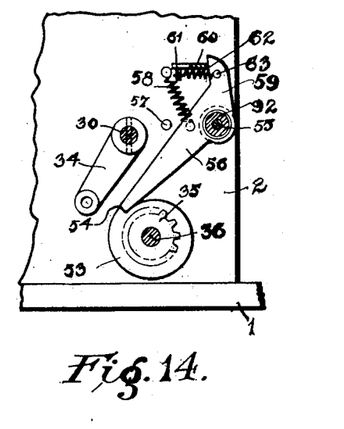
Fig. 14 is a fragmentary view on an enlarged scale, comparable to Fig. 6 but showing the stop dog in engagement with the shoulder of the cam disk to stop the movement of the measuring roller when the capacity of the machine has been reached.

Referring now to the drawing the numeral 1 indicates the base of the machine from about the center of which extends upward a vertical frame member 2. One end of the base 1 is rounded, as indicated at 3, and in this rounded portion there are secured two posts 4, 5, respectively, (Figs. 2 and 3). The numeral 6 indicates a dial which is supported on the upper ends of the posts 4 and 5, and on the top of the center frame member 2. The dial 6 is graduated, and provided in a circular space 7 with fractional numbers to indicate fractions of a yard from ⅛ to ⅞ of a yard and in a central space 8 with a circular series of numerals to indicate yards. The numeral 9, (Figs. 2 and 4) indicates a hollow sleeve which is centered at its upper end in the dial 6 and has secured on said upper end a hand 10, corresponding to the hour hand of a clock, and which is used to designate the numbers indicating yards in the space 8. Secured on the lower end of the sleeve 9 is a gear 11 which is in mesh with a pinion 12 (Fig. 4) which is secured on the upper end of a sleeve 13 on the lower end of which is secured a gear 14. The pinion 12, sleeve 13 and gear 14 are rotatably secured as a whole on a reduced upper end portion of a post 15 which rises from a horizontally-disposed frame member 16, which is secured about midway of the base 1 and dial 6 and is supported on the post 4 and vertical frame member 2, respectively. Secured on the under side of the gear 11 near its periphery is a stud 17, the function of which will be described later. Extending through the hollow sleeve 9 is an arbor 18 on the upper end of which is secured a hand 19, corresponding to the minute hand of a clock, and which is used to designate the fractional numbers in the space 7 indicating fractions of a yard. Secured toward the lower end of the arbor 18 is a pinion 20 which is in mesh with the gear 14. Secured on the arbor 18 above the pinion 20 is a disk 21 provided on its upper side near its periphery with a stud 22, the purpose of which will be presently described. Secured on the arbor 18 below the pinion 20 is a cam disk 23 having a shoulder 24 (Figs. 3, 10, 12 and 13) which is adapted to engage the end of a dog 25 in the reverse motion of the machine to arrest the position of the hands at zero. Secured on the arbor 18 below the cam disk 23 is a bevel gear 26 which meshes with a similar bevel gear 27 (Fig. 5). The bevel gear 27 is fast on one end of a sleeve 28 and on the other end of said sleeve is secured a large gear wheel 29. The sleeve 28 is rotatably mounted on a rock shaft 30 which at one end is rotatably mounted in the frame member 2 and at its opposite end projects through a bearing in the frame member 16 and has secured on its end a crank-arm 31. The gear wheel 29 is in mesh with a pinion 32 which is unitary with a gear wheel 33, (Figs. 4 and 5) said pinion and gear wheel being rotatably mounted on the lower end of a lever arm 34 which is fixedly secured at its upper end upon the rock-shaft 30. The gear wheel 33 is in mesh with a pinion 35 (Figs. 4, 6 and 9) which is secured on a stub shaft 36 mounted in the vertical frame member 2 and which supports and has fixedly secured thereon the measuring roller 37. Secured to the end of the crank arm 31 is a vertically disposed rod 38, (Figs. 2, 3 and 11) which is guided in a plate 39 secured on the under side of the dial plate 6 and normally held in its upward position by a coil spring 40. A stud 41 (Fig. 3) passing through a slot in the crank arm 31 limits the movement of said crank arm. By pressing downward on the rod 38 the crank arm 31 will be moved downward to partly rotate the rock-shaft 30 (Fig. 5) and thereby raise the other end of the crank arm 34 which will release the engagement between the gear wheel 33 and the pinion 35, to permit the measuring and computing elements to be returned to normal or zero position in the manner to be later described. In the movement of the crank arm 34 the pinion 32 simply moves about the gear 29, its path of movement being concentric therewith. The numerals 42 and 43 (Fig. 1) indicate, respectively, two rollers, which are each supported at one end in the frame member 2 and extend into a dust-guard, or housing, 44 which is secured to the upper end of the vertical frame member 2 and projects outwardly therefrom. Secured at its ends to the respective rollers 42, 43 is a chart 45 containing columns of figures (not shown) for enabling the operator to readily tell the cost of the length of fabric measured. The chart 45 is normally wound on one of the rollers, say 42, and in operation is unwound therefrom and wound onto the roller 43. The roller 42 is rotatably mounted on a stub shaft 46 (Fig. 9), and a coil spring 47 has one end connected to said roller and the other to a disk 48 fast on said shaft whereby as the roller 42 is rotated by the pull of the chart 45 being wound on the roller 43 the spring 47 will be placed under tension and in readiness to rewind the chart upon the roller 42 and to restore the actuated parts of the machine to normal position, when the gear 33, previously described, is moved out of engagement with the pinion 35. The mechanism for driving the roller 43 from the measuring roller 37 is as follows:

Rotatably mounted on the shaft 30, to the rear of the gear wheel 29, is a pinion 49, (Fig. 5) which meshes with a gear wheel 50, (Fig. 4), which latter meshes with a pinion 51 which is fast on the inner end of the shaft 52 of the roller 43. Thus, through this and the train of gears previously described, when the measuring roller 37 is rotated the two hands 10 and 19, respectively, will be moved over the dial plate 6 and the roller 43 will be revolved to wind up the chart 45 thereon. At the end of a measuring operation, when the rod 38 is pressed downward to carry the gear 33 out of engagement with the pinion 35, the spring 47 in the roller 42 will operate to restore all of the actuated parts to normal position. As long as the gear 33 is in mesh with the pinion 35 the return of the parts is prevented, the arrangement of the gears being such as to present too great leverage from the roller 42 through the train of gears to the measuring roller to permit it to operate the gears. In order to arrest the movement of the measuring roller at or near the limit of the capacity of the machine the following mechanism is provided:

Secured on the shaft 36 of the measuring roller 37 adjacent to the pinion 35 is a cam disk 53 (Figs. 6 and 14) providing a shoulder 54, said cam disk rotating with said shaft. Pivotally mounted intermediate its ends on a push-rod 55, to be later referred to, is a dog 56 which is normally held in an upward, or retracted position, against a stud 57, by means of a coil spring 58. The said dog has an upwardly projecting arm 59 which bears against the edge of a lever arm 60 which has a stud 61 on its under side. A coil spring 62 is connected at one end to the stud 61 and at the other to a stud 63 on the arm 59. A lever-arm 60, (Fig. 3) is pivotally mounted at its inner end on a post 64 projecting upward from the frame piece 16 and is provided on its upper side with a stud 65. Pivotally mounted on the post 64 above the lever arm 60 is a dog 66 having a shoulder 67, adapted to engage the stud 65 at certain times, and an inwardly projecting arm 68 which lies in the path of the stud 17 (Fig. 4) on the under side of the gear 11. The gear 11 rotates the sleeve 9 which carries the hand 10, and travels at $\frac{1}{12}$ the speed of the bevel gear 26 which drives the arbor 18 carrying the hand 19. Hence, starting from the initial position shown in Figs. 3 and 12, the stud 17, which normally engages the forward side of the arm 68, will not be in a position to engage the rear side of said arm until the hand 19 has nearly completed its twelfth movement over the dial plate 6. At this stage of the movement of the gear 11, the stud 17 will engage the rear side of the arm 68 (Fig. 13) and through engagement of the shoulder 67 with the stud 65 throw the lever arm 60 inward, which places tension on the spring 62, (Figs. 6 and 14), and thereby draws the arm 59 inward and throws the dog 56 outward against the resistance of the spring 58 and into the path of the shoulder 54, which will in the further revolution of the shaft 36 engage the end of said dog and stop further movement of the measuring roller. Pivotally mounted on the post 64 is the dog 25, (Fig. 3) previously referred to. This dog is provided on its upper side with a stud 69 (Figs. 12 and 13) which is adapted to engage a shoulder 70 provided on the opposite side of the dog 66 to that having the shoulder 67. A coil spring 71 normally holds the dog 25 out of the path of movement of the shoulder 24 on the cam disk 23 previously referred to. When the rod 38 is actuated to permit the spring 47 to restore the parts to normal position, as previously described, the stud 17 on the gear wheel 11 in its reverse movement will engage the forward side of the arm 68, as shown by Fig. 12, which will cause the shoulder 70 to engage the stud 69 and thereby move the end of the dog 25 into the path of the shoulder 24 on the cam disk 23, and as the said cam disk is on the arbor 18 which is driven by the bevel gear 26, on which arbor is also secured the pinion 20 from which the sleeve 9 is driven by gears 14, 12 and 11, the movement of the hands 10 and 19 are thereby arrested when they reach the zero position in the return movement of the mechanism. In the measuring movement of the parts the shoulder 24 will be moved away from the end of the dog 25 and the stud 17 will be moved away from the arm 68, thereby permitting the spring 71 to draw the dog 25 outward from the path of movement of the shoulder 24, and in this movement the stud 69 engaging the shoulder 70 moves the dog 66 to bring the shoulder 67 on the opposite side of the dog into engagement with the stud 65 on the lever arm 60, so that when the limit of the capacity of the machine is reached the lever arm 60 will immediately be moved as soon as the stud 17 engages the rear side of the arm 68.

Figures 8, 9:
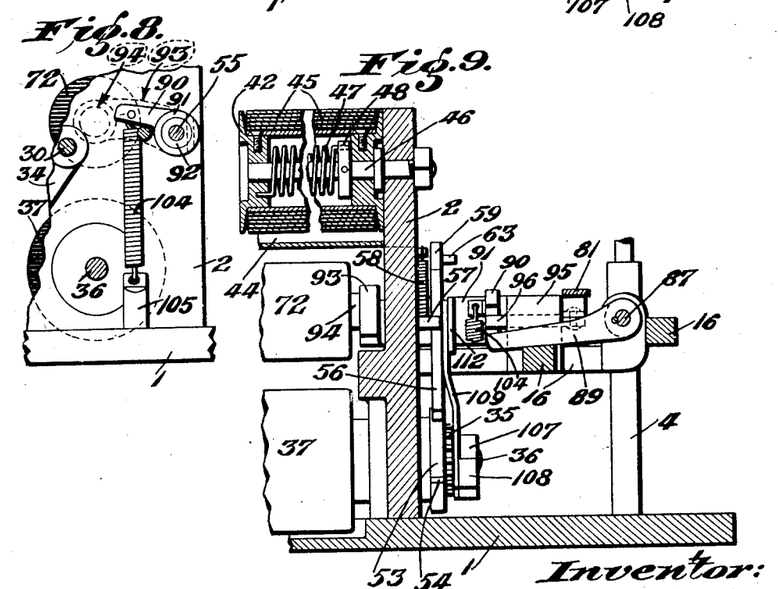
Fig. 8 is a detail view of the tension device for the pressure roller.
Fig. 9 is a fragmentary vertical section illustrating a portion of the mechanism for raising the pressure roller and applying the brake to the measuring roller.
Figure 10:
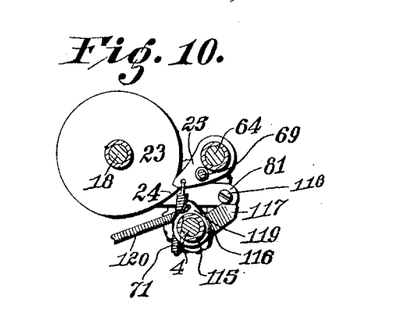
Fig. 10 is a broken sectional plan view taken on a line above the disk 23 of Fig. 4, illustrating the engagement of the arm 25 with said disk and also showing the manner of rotating the sleeve 115 by the spring 120.
Figure 11:
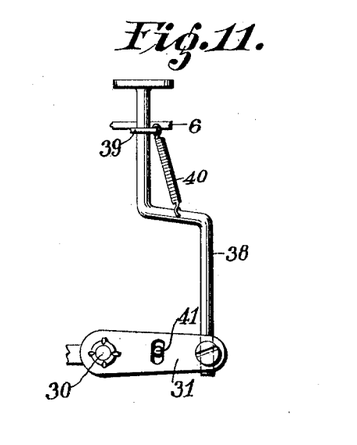
Fig. 11 is a fragmentary view looking at the rear of the machine, illustrating the connection of the pin 41 with the slot in the arm 31.

Located above the measuring roller 37 is a pressure-roller 72, which normally is maintained in a position above the measuring roller, as shown by Fig. 2, to provide a space 73 for the insertion of the edge portion of the fabric to be measured. After the fabric has been inserted between the rollers, the pressure roller 72 is forced downward into firm engagement with the fabric, so that when the latter is pulled between the rollers it will positively rotate the measuring roller and be prevented from slipping between the rolls. The downward movement of the pressure-roller 72 is effected by the release of automatic mechanism in the following manner:

At the right of the machine, i. e., at the side of the machine shown in Fig. 2, there is secured to the vertical frame member 2 a bracket arm 74 which projects outward parallel with the roller 72. The bracket arm 74 is provided at its outer end with a substantially semi-circular housing 75. Pivotally mounted at 76, Figs. 2 and 3, at the forward end of the housing 75, is a bell-crank lever 77, the inner end of which is provided with a thumb-plate 78 which works in the housing 75. The other end of the bell-crank lever is bent outward to provide an arm 79 which engages the end of the push-rod 55, previously referred to, (Figs. 3 and 5), which is pivotally connected to one arm 81 of a bell-crank lever 82 (Fig. 15), which latter is pivotally mounted at 83 on the frame piece 16. The other arm 84 of said bell-crank lever has connected to it one end of a coil spring 85, the other end of which is secured to a stud 86 on said frame piece. Pivotally mounted at the front end of the frame piece 16, and on the right hand side of the machine, is a shaft 87, Figs. 2 and 9, on the front end of which is secured an arm 88 and on the inner end of which is secured a lever arm 89, Figs. 5 and 9, the inner end of which is adapted to engage an arm 90 extending inward from the end of a collar 91 which is secured on a sleeve bearing 92 which in turn is journaled on the push-rod 55 (Fig. 5). The sleeve bearing 92 has secured on its inner end a crank-arm 93 which carries at its outer end a shaft 94 on which the pressure-roller 72 is rotatably mounted. As shown by Figs. 5 and 9, the push-rod 55 is slidably mounted in a lug 95 provided on the frame piece 16. The numeral 96 indicates a pin which is also slidably mounted in the lug 95 and is pivotally connected at its outer end near the outer end of the arm 81 of the bell-crank lever 82. The inner end of the pin 96 normally projects under the arm 90 and thereby operates to hold the roller 72 in an elevated position. Secured on the end of a rock shaft 97, Fig. 2, which latter is journaled in a bracket 98 secured on the side of the vertical frame member 2, is a plate 99 carrying a shear 100 which coöperates with a blade 101 secured on the bracket 98. The plate 99 carries at its upper end a thumb plate 102 by means of which it may be pressed downward and at its lower end is provided with an arm 103 which, when the plate 99 is pressed downward, engages the outer end of the arm 88 and raises the latter, which in turn causes the arm 89, Figs. 5 and 9, to engage the arm 90 and thereby raise the pressure roller 72. This operation occurs at the end of the measuring operation, at which time the shear 100 is operated in the manner described to slit the fabric at the termination of the measured portion, and at the same time to raise the roller 72 to enable the fabric to be removed from the machine. When the arm 90 is raised, the spring 85 (Figs. 5 and 15) will operate the bell-crank lever 82 to move the end of the pin 96 under said arm 90 and also to move the push rod 55 inward, the end of which latter, by engagement with the arm 79, Fig. 3, pushes the thumb plate 78 outward. When the fabric to be measured has been inserted between the rollers in the space 73, the roller 72 is lowered, when released, by the action of a spring preferably in the form of a coil spring 104, Figs. 4 and 8, the upper end of which is connected to the arm 90 and the lower end of which is connected to an adjustable stop 105 which is interiorly screw-threaded to receive a set-screw 106, the head of which is seated in a recess provided in the base 1. The release of the roller 72 is effected by pushing the thumb plate 78 inward so that the arm 79 will push the rod 55 outward, thereby withdrawing the pin 96 from under the arm 90 and permitting the spring 104 to actuate the roller 72 as described. When the arm 90 is again raised by pushing down on the plate 99 to slit the fabric, the pin 96 will be restored to its position under the arm 90 and the push rod 55 be pushed outward, by the action of the spring 85 (Figs. 5 and 15) as previously described.

The provision of means for adjusting the pressure of the roller 72 caused by the pull of the spring 104 is one of the features of improvement of the present invention. The screw 106 (Fig. 4), as will be seen, is readily accessible, and by turning this screw in a manner to cause the stop 105 to be drawn downward, the tension of spring 104 will be increased in a manner to offset any weakening of this spring, or decrease in the gripping power of the roller.

Figure 4:
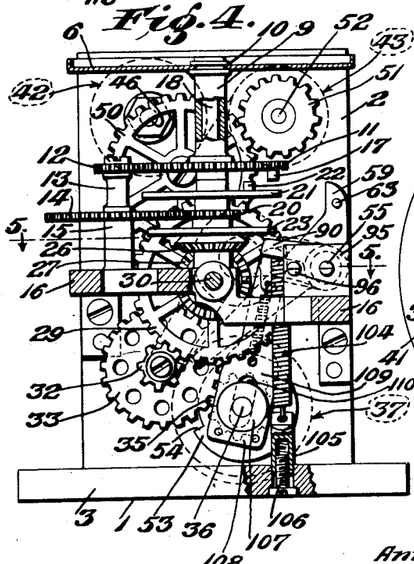
Fig. 4 is a section taken substantially on the line 4—4 in Figs. 2 and 3; and showing also in broken section the tension device for the pressure roller.
Figure 5:
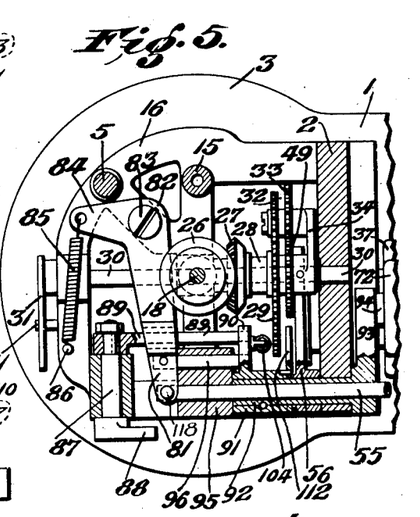
Fig. 5 is a fragmentary horizontal section on the line 5—5 of Fig. 4.
Figure 7:
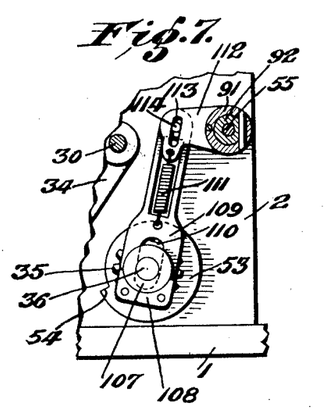
Fig. 7 is a fragmentary detail view illustrating the brake mechanism for the measuring roller.

To brake the measuring roller 37, in order to prevent movement thereof after the fabric has been measured and the pressure-roller raised, the following mechanism is provided, shown particularly in Figs. 4, 7 and 9.

Secured on the end of the shaft 36 of the measuring roller 37, and beyond the pinion 35 thereon, is a brake-drum 107, which is adapted to be engaged by a brake-shoe 108, which latter is secured on the lower end of a bar 109 (Fig. 7). Said bar is provided with a slot 110 to receive the shaft 106, and works over said shaft between the drum 107 and the pinion 35. The upper portion of the bar 109 is slotted to house a coil spring 111, the lower end of which is connected to the bar, and the upper end of which is connected to a lug depending from an arm 112 connected to and projecting inwardly from the opposite end of the sleeve 91 to that having the arm 90. The outer end of the arm 112 is provided with a slot 113 in which works a pin 114 provided at the upper end of the bar 109. When the roller 72 is raised by engagement of the lever arm 89 with the arm 90, it will be seen that the rotation of the sleeve 91 thereby occasioned will cause the arm 112 to be raised, thereby placing the spring 111 under tension, which draws the bar 109 upward to bring the brake shoe 108 into engagement with the brake drum 107. When the rod 55 is pushed inward to permit the roller 72 to be drawn downward by the spring 104, the arm 112 will be moved downward by the sleeve 91 and thereby release the tension on the spring 111, and the top of the slot 113 engaging the pin 114 will force the bar 109 downward to remove the brake shoe 108 from frictional engagement with the brake drum 107.

The mechanism just described constitutes another important feature of the present invention, as it prevents any accidental movement of the measuring roller by the operator after, or while removing the fabric from between the rollers.

The present invention also comprises means for locking the pressure roller 72 in its raised position after a measuring operation until the hands of the measuring dial have been returned to the zero position. This result is accomplished by the following mechanism, referring particularly to Figs. 2 and 3:

Rotatably mounted on the post 4 is a sleeve 115, carrying at its lower end an arm 116 which is provided at its lower end with an outwardly-bent portion forming a stop 117, which latter is adapted to be turned in to and out of the line of movement of a stud 118 projecting upwardly from the inner end of the push-rod 55. This stud also acts as a pivotal connection between the end of the bell-crank lever 82 (Fig. 5) and the end of the said push-rod. The sleeve 115 also has at its lower end an outwardly projecting lug, indicated by the numeral 119, in Fig. 2, and shown by dotted lines only in Fig. 3, to which is secured, one end of a coil spring 120, the opposite end of which is secured, for convenience, in the end of the arm 84 of the bell crank lever 82. It could as well be connected to a fixed part of the machine. Secured at the upper end of the sleeve 115 is an arm 121 which is provided on its upper side with a stud 122. Rotatably mounted on the post 4 above the sleeve 115 is a second sleeve 123 which is provided with a downwardly and inwardly bent arm 124 the end of which extends across the path of movement of the stud 22 on the disk 21 previously referred to. The stud 22 engages the forward side of the arm 124 and normally holds the stop 117 out of the path of movement of the stud 118. The spring 120 tends to rotate the sleeve 115 and draw the stop 117 into a position behind said stud to prevent the outward movement of the push rod 55 as soon as the stud 22 is turned by the disk 21 out of engagement with the end of the arm 124. The arm 124 has on its under side a pin, indicated by the numeral 125 in Fig. 2, and shown by dotted lines in Fig. 3, which is normally engaged by the inner side of the arm 121. A coil spring 126 connects the stud 122 of the arm 121 to the arm 124. The purpose of this arrangement is to permit movement of the arm 124 independently of the arm 121. Thus, in the measuring operation, as soon as the roller 37 is rotated by drawing the fabric through the machine, the stud 22, Figs. 3 and 4, will be moved away from the forward side of the arm 124 and in the continued movement of the disk 21 the stud 22 will strike the rear side of the arm 124 which will move it, against the resistance of the spring 126, and when the said stud passes off of said arm the said spring will draw the arm backward to bring its stud 125 into engagement again with the arm 121. This operation will occur for every cycle of movement of the disk 21. A similar operation occurs in the reverse movement of the disk 21 when the gear 33 is moved outward by pushing down on the rod 38 to permit the spring 47 to restore the hands to zero position. In this movement, each time the stop strikes the forward side of the arm 124, said arm will yield against the resistance of the spring 120, in such movement the stud 125 engaging the arm 121 and causing the sleeve 115 and arm 116 to be moved outward. This operation also occurs with each return cycle of movement of the disk 121, until the shoulder 24 on the cam disk 23 engages the dog 25 (Figs. 3, 12 and 13), which will arrest the movement of the disk 21 with the stud 22 engaging the forward side of the arm 124 and holding the stop 117 out of the path of movement of the stud 118, such position of the parts being shown in Fig. 3.

Figure 15:
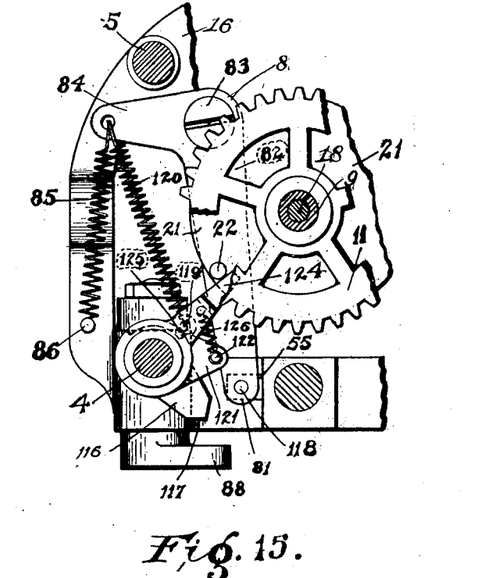
Fig. 15 is a fragmentary view on an enlarged scale showing the mechanism partly illustrated in Fig. 3 for preventing the pressure roller from being arrested before the hands of the dial have been returned to the zero position.

In operation, when the fabric has been placed between the rollers 37 and 72 the thumb plate 78 (Fig. 3) is pressed inward to permit the roller 72 to be lowered by the spring 104 (Fig. 8), as previously described. In such movement of the thumb-plate the push-rod 55 (Figs. 3 and 8) is pushed outwardly to withdraw the pin 96 from under the arm 90, to allow roller 72 to move as described. The fabric is then drawn between the rollers, the movement causing the disk 21 (Fig. 4) to carry the stud 22 out of contact with the arm 124 (Figs. 3 and 15). At the end of the measuring operation the blade 99 is pushed downward to slit the fabric and raise the roller 72, and the spring 85, Fig. 5, acting through the bell crank lever 82, again throws the push-rod 55 inward. Concurrently with this operation the spring 120 (Figs. 3 and 15) will rotate the sleeve 115 (Fig. 2) to throw the stop 117 into engagement with the stud 118 on the push-rod 55. It will now be impossible for the operator again to actuate the thumb-plate 78 to lower the roller 72, because the stop 117 will prevent the outward movement of the push-rod 55. Before he can again use the machine for measuring, therefore, he is compelled to restore the hands to zero by depressing the bar 38, so that the stop 117 will be turned out of the path of movement of the push-rod 55, or into the position shown in Fig. 3.

The safety-lock arrangement just described is considered of great importance, as otherwise a careless operator might begin measuring goods for a new customer with the hands in the position they were left from measuring goods for a preceding customer, and thus unintentionally defraud the second customer of a length of goods equivalent to the amount previously measured on the machine.

The invention not only provides means for preventing a second use of the machine until the indicating mechanism, in the present case the hands 10 and 19, have been restored to the zero position, but, in its broader aspect, it furnishes a warning to the operator to re-set the hands before proceeding with a new measuring operation. That is to say, as the first step, after inserting the fabric between the rollers, is to push in the thumb-plate 78, the impossibility of doing this at once apprises the operator that the hands must be reset before proceeding farther. In this regard, therefore, the automatic lock acts in the nature of a signal, or alarm, to warn the operator of the condition of the machine.

In order that the operation of the improvements herein described may be understood in their relation to the operation of the machine as a whole, it has been necessary to describe a great deal of mechanism which, as to function, if not precise construction, has been described and claimed in previous applications of the late Walter E. Hosch. The claims, however, set forth the improvements herein claimed.

What is claimed is:—

1. In a fabric measuring machine, in combination with a measuring-roller and a pressure-roller between which fabric is adapted to be drawn to be measured, mechanism for separating said pressure-roller from the measuring roller, and a brake-device carried by said mechanism and operated thereby to brake the measuring-roller when the pressure-roller is separated therefrom.

2. In a fabric measuring machine, in combination with a measuring-roller and a pressure-roller between which fabric is drawn to be measured, mechanism for separating said pressure-roller from the measuring-roller, a brake-device coöperating with said measuring-roller, and a spring interposed between said brake-device and said mechanism and by means of which said brake is drawn into braking engagement with the measuring-roller when said pressure-roller is separated therefrom.

3. In a fabric measuring machine, in combination with a measuring-roller and a pressure-roller, means for separating said pressure-roller from the measuring-roller comprising a pivoted member and means for actuating the same, an arm carried by said pivoted member, a brake-drum on said measuring-roller, a bar coöperating with and movable independently of said arm and carrying a brake-shoe adapted to engage said brake-drum, and a spring connecting said arm with said bar for drawing the brake-shoe into engagement with the brake-drum, when said arm is actuated by said pivoted member.

4. In a fabric measuring machine, in combination with a measuring-roller and a pressure-roller between which fabric is drawn to be measured, a pivoted member carrying a cutting device for slitting the fabric at the termination of the measuring operation, mechanism adapted to be actuated by said member in the cutting movement thereof to raise said pressure roller, and means operated by said mechanism to brake the measuring-roller as the pressure-roller is separated therefrom.

5. In a fabric measuring machine, in combination with a measuring-roller and a pressure-roller between which fabric is drawn to be measured, mechanism for separating said pressure-roller from the measuring-roller, releasable means for holding the pressure-roller in its separated position, a spring for drawing the pressure-roller into engagement with said measuring-roller when the former is released, and means for adjusting the tension of said spring to vary the degree of pressure exerted by the pressure-roller on the fabric between the rollers.

6. In a fabric measuring machine, in combination with a measuring-roller and a pressure-roller between which fabric is drawn to be measured, means for separating the pressure-roller from the measuring-roller, releasable means for temporarily holding the pressure-roller in its separated position, a coil spring for drawing said pressure roller into contact with the measuring roller when the former is released, a screw-threaded member engaged by one end of said spring, and a screw seated in the frame of the machine and having screw-threaded engagement with said member, whereby, by turning said screw, said member may be moved to vary the tension of said spring and thereby adjust the pressure exerted by said pressure-roller on the fabric being measured.

7. In a fabric measuring machine, in combination with a measuring-roller and a pressure-roller between which the fabric is drawn to be measured, a dial for indicating measurement, hands movable over said dial, gearing actuated by said measuring-roller for moving said hands, means for separating the pressure roller from the measuring roller, means under the control of the operator for restoring the hands to zero position, and automatic means operating to prevent movement of the pressure-roller into engagement with the measuring roller until the operator has caused the hands to be returned to the zero position.

8. In a fabric measuring machine, in combination with a measuring-roller and a pressure-roller between which fabric is drawn to be measured, elevating mechanism for raising said pressure roller, a pivoted shear for slitting the fabric at the end of the measured operation, means engageable by said shear in the cutting operation to actuate said elevating mechanism to raise the pressure roller, spring-controlled mechanism operating to automatically engage said elevating mechanism and hold the pressure-roller in its raised position, means under the control of the operator for actuating said latter mechanism to release the pressure roller, a measuring dial, hands movable thereover for indicating measurement and means whereby said hands are actuated from said measuring roller, means under the control of the operator for restoring the hands to zero position after the measuring operation, and automatic locking mechanism operating to prevent the actuation of said releasing means until the operator has caused the hands to be restored to zero position.

9. In a fabric measuring machine, in combination with a measuring-roller and a pressure-roller between which fabric is drawn to be measured, elevating mechanism for raising said pressure-roller, a pivoted shear for slitting the fabric at the end of the measuring operation, means engageable by said shear in the cutting operation to actuate said elevating mechanism to raise the pressure-roller, spring-controlled mechanism operating to automatically engage said elevating mechanism and hold the pressure-roller in its raised position, means under the control of the operator for actuating said latter mechanism to release the pressure-roller, a measuring dial, hands movable thereover for indicating measurement and means whereby said hands are actuated from said measuring-roller, means under the control of the operator for restoring the hands to zero position after the measuring operation, automatic locking mechanism operating to prevent the actuation of said releasing means until the operator has caused the hands to be restored to zero position, and automatic means for releasing said locking mechanism in the movement of the hands to the zero position.

10. In a fabric measuring machine, in combination with a measuring-roller and a pressure-roller between which the fabric is drawn to be measured, a dial for indicating measurement, hands movable over said dial, gearing actuated by said measuring-roller for moving said hands, means for separating the pressure-roller from the measuring-roller, means under the control of the operator for restoring the hands to zero position, and automatic means operating upon the separation of the rollers to lock the machine against a further measuring operation until the operator has caused the hands to be returned to the zero position.

11. In a fabric measuring machine, in combination with a measuring-roller and a pressure-roller between which the fabric is drawn to be measured, a dial for indicating measurement, hands movable over said dial, gearing actuated by said measuring-roller for moving said hands, means for separating the pressure-roller from the measuring-roller, means under the control of the operator for restoring the hands to zero position, and automatic means operating upon the separation of the rollers to provide a warning to the operator to return the hands to zero position before again using the machine for a measuring operation.

12. In a fabric measuring machine, in combination with a measurement indicator, measuring mechanism for operating the same, including movable members for engaging the fabric to be measured, means for returning said indicator to zero position, means for releasing engagement between said members and the fabric at the end of a measuring operation, and automatic means operating upon the release of said members from engagement with the fabric to provide a warning to the operator to return the indicator to zero position before again using the machine for a measuring operation.

13. In a fabric measuring machine, in combination with a measurement indicator, measuring mechanism for operating the same, including movable members for engaging the fabric to be measured, means for returning said indicator to zero position, means for releasing engagement between said members and the fabric at the end of a measuring operation, and automatic means operating upon the release of said members from engagement with the fabric to render said measuring mechanism inoperative until said indicator has been returned to zero position.

In testimony whereof, we have hereunto set our hands.

ANNIE MAE HOSCH,
*Administratrix of Walter E. Hosch, deceased.*
DOUGLAS TURNER.